(12) United States Patent
Kitagawa (10) Patent No.: US 8,289,562 B2
(45) Date of Patent: Oct. 16, 2012

(54) IMAGE PROCESSING APPARATUS, METHOD AND RECORDING MEDIUM

(75) Inventor: Yusuke Kitagawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 899 days.

(21) Appl. No.: 12/212,825

(22) Filed: Sep. 18, 2008

(65) Prior Publication Data

US 2009/0080020 A1 Mar. 26, 2009

(30) Foreign Application Priority Data

Sep. 21, 2007 (JP) ................................ 2007-246178
Aug. 1, 2008 (JP) ................................ 2008-199308

(51) Int. Cl.
*G06K 15/00* (2006.01)
(52) U.S. Cl. .................................................... 358/1.18
(58) Field of Classification Search .................. None
See application file for complete search history.

(56) References Cited

U.S. PATENT DOCUMENTS

| 7,808,663 B2 * | 10/2010 | Teranishi et al. ............ 358/1.15 |
| 2002/0122067 A1 * | 9/2002 | Geigel et al. .................. 345/788 |
| 2007/0146504 A1 * | 6/2007 | Morimoto et al. ......... 348/231.3 |
| 2009/0003731 A1 * | 1/2009 | Nitta et al. .................... 382/298 |

FOREIGN PATENT DOCUMENTS

| JP | 2006-67357 A | 3/2006 |
| JP | 2006-174178 A | 6/2006 |

* cited by examiner

*Primary Examiner* — Marivelisse Santiago Cordero
*Assistant Examiner* — John Wallace
(74) *Attorney, Agent, or Firm* — Sughrue Mion, PLLC (57) ABSTRACT

When a print area is filled with an initial number α of thumbnails (reference images) and a margin β is left in a print area, a total number γ of thumbnails are added from each video image so that the margin in the print area is fully filled with the thumbnails and a waste of a paper is prevented. As the number of thumbnails of frames in a video image, it becomes easier to recognize content of the video image.

17 Claims, 5 Drawing Sheets

IMAGE PROCESSING APPARATUS, METHOD AND RECORDING MEDIUM

BACKGROUND OF THE INVENTION

1. Field of the Invention

The present invention relates to a generation of an output data showing a recorded image list.

2. Description of the Related Art

According to Japanese Patent Application Laid-Open No. 2006-67357, a characteristic data showing a characteristic of an image to be a thumbnail is recorded beforehand in a memory. A CPU detects a still image having a certain level or more of resemblance to the characteristic data in a plurality of still images which constitute a video image showed by a video image data to be processed and generates a thumbnail of the detected still image.

According to Japanese Patent Application Laid-Open No. 2006-174178, an extracting condition reading unit reads out a frame extracting condition of each scene based on scenario information generated by a scenario generating unit, thereby generating a time stamp of each scene. A frame extracting flag is incorporated in the most characteristic frame of the scene in the time stamp. The frame extracting unit extracts a frame having the frame extracting flag by monitoring a photo movie output from a photo movie output unit. A thumbnail image generating unit generates a thumbnail image having a size determined by the frame extracting condition. In an obtained index image, characteristics of each scene are captured and thumbnail images of important scenes, etc. are enlarged. Thus, the photo movie content is clearly signified to a user.

SUMMARY OF THE INVENTION

When a lot of digital video images are recorded, the video images are recorded in a high capacity medium such a DVD in most cases. In this case, it is hard to find which video image is recorded in which medium.

Japanese Patent Application Laid-Open No. 2006-67357 and Japanese Patent Application Laid-Open No. 2006-174178 mostly relate to the scene extraction to extract the most suitable image from the video image. For example, when thumbnails are outputted by an index print, depending on the number of the extracted still images from the video image, the inventions of Japanese Patent Application Laid-Open No. 2006-67357 and Japanese Patent Application Laid-Open No. 2006-174178 may spend a number of papers occupying the most of a cost price in a video image recording service. Therefore, a store which wants to achieve both of the service and the cost reduction can not be satisfied.

In addition, it is possible for a user to specify a desired scene to use the still image for the index image, but an operating efficiency is bad in this case.

An object of the present invention is to eliminate a blank (margin) in an output area of an index and to make it possible to generate index data with which the user can easily recognize a content of the video image recorded in the medium.

An image processing apparatus according to an aspect of the present invention includes: an input unit which inputs a contents data group including at least a video image; a first reference image number determination unit which determines a first reference image number which is a provisional number of reference images such as thumbnail images, icons and so on, the reference images corresponding to the contents data group inputted from the input unit; a margin amount calculating unit which calculates an amount of a margin to be left in a predetermined output area, in case where the first reference image number of reference images corresponding to the contents data group are arranged in the predetermined output area, the first reference image number determined by the first reference image number determination unit; a second reference image number determination unit which determines a number of the reference images to be added based on the amount of the margin calculated by the margin amount calculating unit, and then determines a second reference image number which is a final number of the reference images corresponding to the contents data group based on the first reference image number and the number of reference images to be added.

According to the image processing apparatus, the number of thumbnails (reference images) corresponding to a video image is determined depending on the margin space of the print area so that the margin space of the output area is filled. Therefore, the waste of the margin space can be prevented and it becomes easy for a user to recognize the content of the video image with a plurality of the thumbnails. There is a big advantage especially for an end user who shoots many video images (for example, parents who shoot video images of their child).

The image processing apparatus according to the aspect of the present invention may further include an extracting unit which extracts a number of still images equivalent to the second reference image number from a video image included in the contents data group inputted by the input unit.

The image processing apparatus according to the aspect of the present invention may further include a reference image generating unit which generates a number of the reference images equivalent to the second reference image number, the reference images corresponding to the contest data group inputted by the input unit.

In the image processing apparatus according to the aspect of the present invention, the reference image generating unit may generate the reference image based on the still image extracted by the extracting unit.

In the image processing apparatus according to the aspect of the present invention, the second reference image number determination unit may determine the number of the reference image to be added so far as the reference image fills in the margin.

In the image processing apparatus according to the aspect of the present invention, the contents data group may also include a still image.

The image processing apparatus according to the aspect of the present invention may further include an output data generating unit which generates output data indicating a list of the contents data group by arranging the reference images generated by the reference image generating unit in a predetermined output area.

In the image processing apparatus according to the aspect of the present invention, the output data generating unit may generate data to which information indicating an association between a plurality of the reference images generated based on the same video image, is added.

The image processing apparatus according to the aspect of the present invention may further include: a print data generating unit, included in the output data generating unit, which generates print data for an index print indicating the list of the contents data group; and a print unit which generates the index print on a predetermined print medium based on the print data for the index print.

In this case, the margin of the print is filled with the thumbnails of the video image which are additionally extracted so that the margin of the print can be efficiently used.

In the image processing apparatus according to the aspect of the present invention, the output data generating unit may include a display data generating unit to generate an indication data for a list screen to indicate a list of the contents data group.

The image processing apparatus according to the aspect of the present invention may further include a display unit which displays the list screen based on the display data for the list screen generated by the display data generating unit.

An image processing method according to an aspect of the present invention, includes: an input step of inputting a contents data group including at least a video image; a first reference image number determination step of determining a first reference image number which is a provisional number of reference images such as thumbnail images, icons and so on, the reference images corresponding to the inputted contents data group; a margin amount calculating step of calculating an amount of a margin to be left in a predetermined output area, in case where the first reference image number of reference images corresponding to the contents data group are arranged in the predetermined output area; a second reference image number determination step of determining a number of reference images to be added based on the amount of the margin, and then determining a second reference image number which is a final number of the reference images corresponding to the contents data group based on the first reference image number and the number of the reference image to be added.

A program causing a computer to execute the image processing method according to the aspect of the present invention is also included in the scope of the present invention.

A recoding medium, on which the program causing a computer to execute the image processing method according to the aspect of the present invention is recorded, is also included in the scope of the present invention.

According to the present invention, it is possible to determine the number of reference images (for example, thumbnails) corresponding to a video image and to fill in a margin space of an output area based on an amount of the margin space of the output area (for example a print area and a display area). Therefore, the waste of the margin space can be prevented and it becomes easy for a user to recognize the content of the video image with a plurality of the thumbnails. There is a big advantage especially for an end user who shoots many video images (for example, parents who shoot video images of their child).

DETAILED DESCRIPTION OF THE PREFERRED EMBODIMENT

First Embodiment

Figure 1:
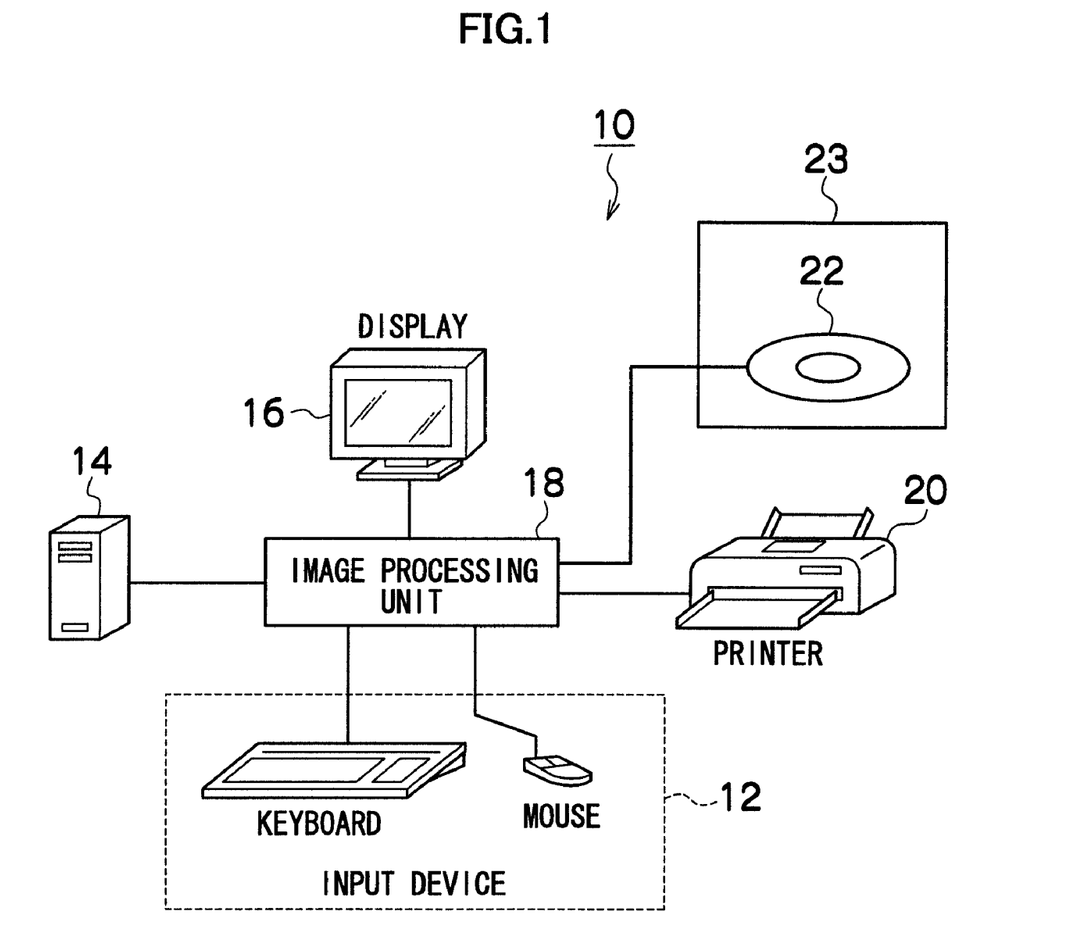
FIG. 1 is a schematic diagram showing a configuration of a photo printer system.

FIG. 1 shows a schematic configuration of a photo printer system (image printer system) 10 according to a preferred embodiment of the present invention. The photo printer system includes: an input device 12 such as a keyboard, a mouse, etc. to input a various instruction; a contents input device 14 which reads out a various contents data such as a still image and a video image, a text data, music data recorded in a recording medium such as a memory card, a flash memory, a CD-R, a DVD, etc., or a digital camera, a mobile telephone, a terminal device which are connected to the photo printer system 10 by conforming to various communication standards such as a UBS, etc. according to the instruction input with the input device 12; a display (display device) 16 which displays the various image; a image processing unit (image processing device) 18 which generates a print data of an index print by arranging a thumbnail image corresponding to a shot image read out by the contents input device 14 according to the instruction input with the input device 12 and generates a print data of each image; a printer (image output device) 20 which generates a picture print and an index print by exposing and developing based on the image data generated by the image processing unit 18 according to the instruction input with the input device 12; and a recording unit (image output device) 23 which records the image data generated by the image processing unit 18 in a DVD, a CD-R and another predetermined medium 22 according to the instruction input with the input device 12.

The image processing unit 18 includes a CPU, a RAM, and a ROM. Programs, data, and parameters which are necessary for an information processing are recorded in the ROM. The CPU executes the programs recorded in the ROM and writes the necessary information to the RAM thereby the CPU performs the various information processing.

A print size of the index print and an image size of the thumbnail are not limited. A number of thumbnails which can be shown on the index print occasionally changes depending on a print size and image size, an arrangement distance, and the like. In case of a photo index print, for example, the number of the thumbnails is twenty four.

Figure 2:
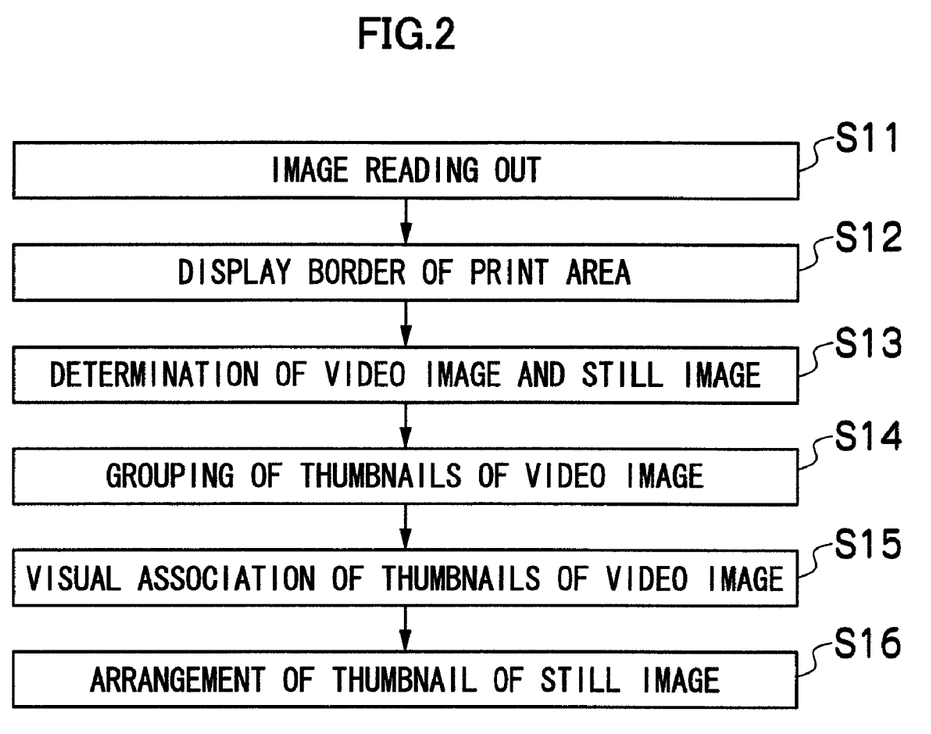
FIG. 2 is a flow chart showing an index print.

Next, according to the flow chart in FIG. 2, an outline of operations to generate the index print in the photo printer system 10 is described. The process is controlled by the image processing unit 18. The program to prescribe the process is recorded in the ROM.

The various instructions are given to the image processing unit 18 through the input device 12 to generate the index print in the photo printer system 10. First of all, the instruction to input the image is given thorough the input device 12. Based on the instruction, the shot still image and video image are read out and the read data (digital data) is input to the image processing unit 18 from the contents input device 14 (step S11).

Then, the instruction to generate the index print is given through the input device 12. Based on the instruction, an outer border of a print area corresponding to a photo print size is displayed on the display 16 to arrange the thumbnail by the image processing unit 18 (step S12).

The shot image is respectively determined whether a video image or a still image by the image processing unit 18 (step S13) and according to the determination result, the extraction of the video image thumbnail and a grouping are performed (step S14). The determination of the number of the thumbnails of a video image to be extracted is hereinafter described.

Next, an arrangement sequence of the thumbnails is determined by the image processing unit 18. In the print area, the thumbnails of the frame images extracted from the same video image are visually associated and arranged (step S15) and the thumbnails of the still images are arranged (step S16). In other words, the only thumbnails of the same video image are grouped, and are arranged so as to distinguish from thumbnails of the other video images or still images visually. In addition, the conventional technique to generate or extract the still image from the video image (for example, Japanese Patent Application Laid-Open No. 2005-244382) can be employed. The image processing unit 18 can also generate the print data of each image based on the still image extracted from the video image.

Instead of generating thumbnails based on image information of the video image itself, or at the same time of generating thumbnails based on image information of the video image itself, it is possible to generate information representing the substance of the video image by using the information other than image information of the video image. For instance, the image processing unit 18 converts voice information recorded with being accorded with the video image to character information, and extracts a specific keyword included in the character information, such as a part indicating a personal name, a name of a place, a weather, a date, etc. Then, the image processing unit 18 converts the keyword to graphic data (the thumbnail image, the icon, etc.) having a same size with the thumbnail so that it is possible to use the graphic data instead of the thumbnail image, or with the thumbnail image. In addition, the keyword can be text information attached to the thumbnail image or the icon. Alternatively, in case where music data such as a MP3 file is input to the contents input device 14, the image processing unit 18 converts music information and a name of an artist included in metadata of the music data to graphic data having the same size with the thumbnail.

Figure 3:
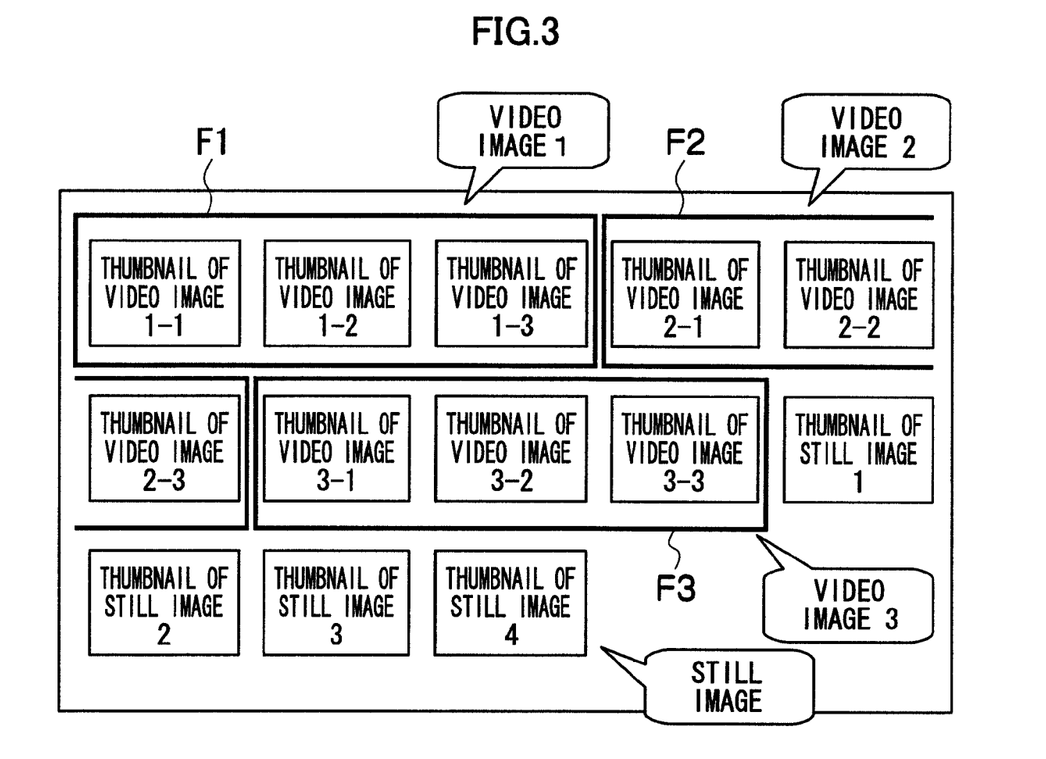
FIG. 3 is a diagram showing an example of a video image thumbnail associated by a frame.

For example, the thumbnails 1-1, 1-2, 1-3, which are predetermined number Ni (in this example, Ni=3) of thumbnails extracted from "Video Image 1," are surrounded with a frame F1 so that the thumbnails are visually associated with each other as shown in FIG. 3. The thumbnails extracted from the same video image are preferably arranged on the same page to obtain good appearance with a sense of unity. When the number of the thumbnails to be extracted from the same video image is set to be the maximum number of the thumbnails per one page or less, the thumbnails extracted from the same video image are not arranged on a plurality of pages.

In the same way, the thumbnails 2-1, 2-2, 2-3 extracted from 'Video Image 2' are surrounded with a frame F2, and the thumbnails 3-1, 3-2, 3-3 extracted from 'Video Image 3' are surrounded with a frame F3 so that the still image thumbnails extracted from each video image are visually associated with each other.

Figure 4:
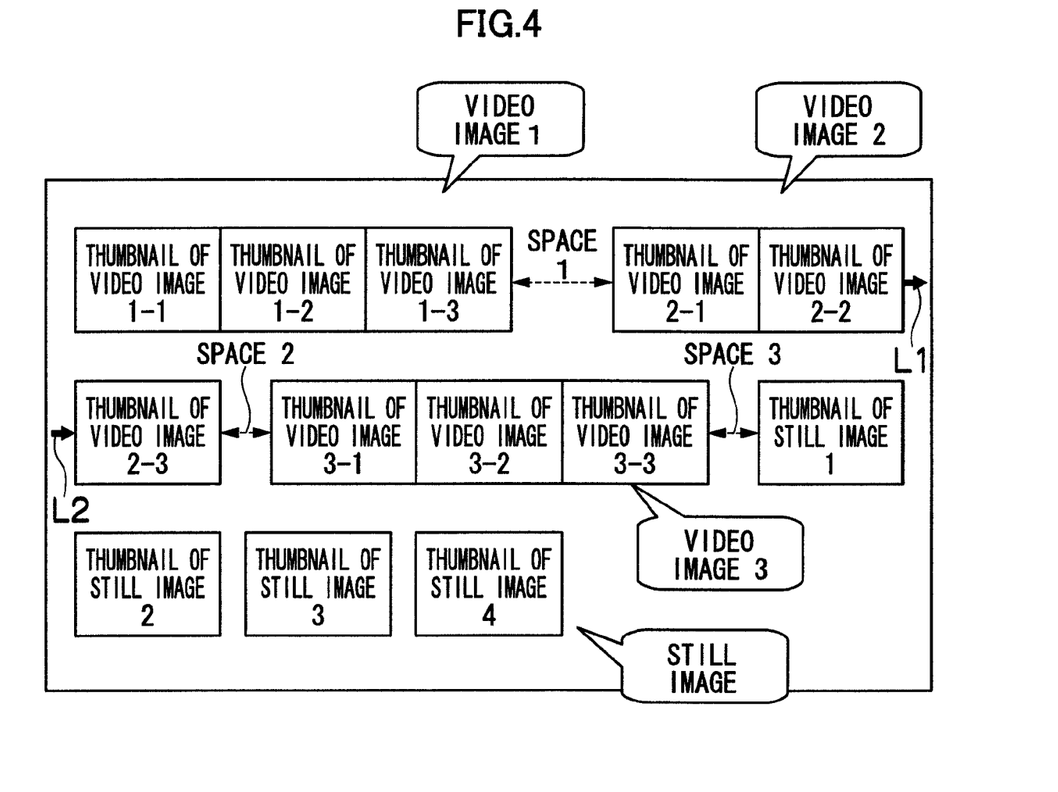
FIG. 4 is a diagram showing an example of the video image thumbnail associated by an arrangement.

Alternatively, as shown in FIG. 4, the thumbnails 1-1, 1-2, 1-3 extracted from 'Video Image 1' are continuously arranged. The thumbnails 2-1, 2-2, 2-3 extracted from 'Video Image 2' are continuously arranged and at the same time, the thumbnails 2-1, 2-2, 2-3 are arranged so as to set apart from the thumbnail 1-3 of 'Video Image 1' by a predetermined space (Space 1). The thumbnails 3-1, 3-2, 3-3 extracted from 'Video Image 3' are continuously arranged and at the same time, the thumbnails 3-1, 3-2, 3-3 are arranged so as to set apart from the thumbnail 2-3 of 'Video Image 2' by a predetermined space (Space 2) and from the still image thumbnail 1 by a predetermined space (Space 3). In case that thumbnails of the same video image are not able to be arranged in the same row or the same column because of the print area (Thumbnails 2-2, 2-3 in FIG. 4), markers L1 and L2 may be attached to the thumbnails to visually indicate that both thumbnails are extracted from the same video image.

A still image is arranged to separate from the thumbnail of the video image. However, in case of a still image and a video image recording the same scene, a symbol or a graphic can be provided to thumbnails of the still image and the video image so as to visually indicate that the scenes of them are identical. For example, the image processing unit 18 estimates an estimated shooting time of each frame from a shooting start time information included in the attached information of the video image and an elapsed time from the first image of the video image to each image, and determines that the recorded still image having the shooting time information according with the estimated shooting time as an attached information is the same scene. Alternatively, the result of a comparison between an object feather information extracted from the frame of the video image and the still image described below, when both of the object feather information are same, the video image and the still image are determined as the same scene. It can be possible to determine as the same scene when both of the accordance of the shooting time and the accordance of the object feather information are satisfied. Incidentally, the arrangement of the thumbnails may be lengthwise, not limited to crosswise. Also, the thumbnails of the same video image may be arranged to form a predetermined shape (rectangle, U-shape and like).

The specific manners of the visual association of the thumbnails are not limited to the example above. For instance, the thumbnails extracted from the same video image may be connected with each other by a dashed line or uniformed the size.

The extraction of the thumbnail in the step S14 and the determination of the arrangement in the step S15 are specifically described below.

According to the total number of the thumbnails a corresponding to a video image or a still image (depending on an order content, there is a case with no still image and only a video image.) which are ordered to record in the recording medium 22 and the possible number of the thumbnails to print inside the print area corresponding to an identifying information of various index prints, a margin size $\beta$ of the print area in the index print is calculated.

Next, the total additional number of the thumbnails $\gamma$ which is the number of the thumbnails to add within the margin in the print area is determined according to the calculated margin size $\beta$. Then, the final number $\delta=\alpha+\gamma$ of the thumbnails to be arranged in the index print is calculated.

In other words, when the print area is not fully filled with the thumbnails with the initial number $\alpha$ and there is still the margin $\beta$, the thumbnails to have the total number $\gamma$ are added from each video image. Therefore, the margin in the print area is fully filled and it is possible to prevent wasting papers. In addition, when the number of the thumbnails extracted from the video images frames is bigger, the content of the video image becomes easier to be recognized.

When A to G respectively represents as below, the initial number a is calculated in the following.

A: the identifying information of the index print

B: the possible number of the thumbnails to print corresponding to A

C: the number of the thumbnails to extract from each video image

D: the number of the video images in the order

E: the number of the still images in the order

Fm: the recording time of each video image

G: the number of the index prints to be used in the video image service (set value)

($\alpha$-1) is a way to use the set value of the number of the images to be extracted to put priority to ensure the number of extracted images. The number of the thumbnails a is calculated using C, D, E (for example, $\alpha=C \times D+E$).

($\alpha$-2) is a way to perform weighting with the recording time of the video image to put priority to ensure the number of the extracted images. The recording time Fm is obtained from each video image. The number of the still images to be extracted Cm is determined according to the recording time (Cm=f(Fm), f is a weighting function having the recording time Fm as a parameter). Then, the number of the thumbnails a is determined by Cm and E ($\alpha=\Sigma Cm+E$). The weighting of the extracted number based on the recording time is performed because it has little use to extract many still images from the video image which has a short recording time, in terms of recognizing the content of the video image. The parameter of the weighting is not limited to the recording time. For example, the larger Cm may be preferentially given to the video image which has the later time stamp.

($\alpha$-3) is a way to use the set value of the number of the index prints to put priority to save the print number. The number of the thumbnails a is calculated using B, G, D and E ($\alpha=[(B\times G-E))-D]+E$, [ ] is gauss symbol and in this case, it is the quotient of $(B\times G-E))\div D$).

($\alpha$-4) is a way to perform weighting with the recording time of the video image to put priority to save the print number. The total number of the extracted thumbnails a is determined using B and G ($G\times B$). The recording time Fm is obtained from each video image. The number of the still images to extract from each video image Cm is determined (Cm=f(Fm, $G\times B$); f is a weighting function) corresponding to the recording time Fm and the total number of the extracted thumbnails ($G\times B$). Then, the number of the thumbnails is calculated with using Cm and E ($\alpha=\Sigma Cm+E$).

The number of the extracted thumbnails a can be any numeric value as long as depending on an attribute of the video image, for example the number of the scenes in the video image, the number of the people appearing in the video image, etc. For example, as well as Japanese Patent Application Laid-Open No. 2004-297697, a number of scene changes can be recognized as the number of the extracted thumbnails a with determining an occurrence of the scene change by an alternation of a color temperature, and an alternation of a gain value which is one of a white balance information. In another way, as shown in Japanese Patent Application Laid-Open No. 2008-3749, a face feature information of people and an other object feature information are extracted from each frame image which is extracted from the video image. Then, the number of the people or object having the different feature information is determined by matching the extracted feature information each other, and the number is made to be the number of the extracted thumbnails $\alpha$.

The way of calculating the margin size $\beta$ of the print area is to determine the number of the thumbnails which is able to print in the margin ($\beta=n\times B-\alpha$: n is a natural number and $\beta$ is set to be equal or smaller than B) when it is determined for the index print to have the margin (when a is not a natural multiple number of B, in other words, each page of the index print is not filled with the thumbnails.).

For example, the way of calculating the total number of the thumbnails to additionally extract from each video image $\gamma$ is ($\gamma$-1) to simply calculate from the number of the video images. $\beta$ is divided by D to obtain a quotient and a remainder and then the quotient is set to be the number of the frames to extract from each video image. 1 is added to the number of the still images to be extracted from each video image until the remainder becomes 0, when the remainder is not 0 by sorting each video image in order of the predetermined manner such as the size of the Fm, the file name, the time stamp and like. Thereby, the number of thumbnails $\gamma$ to extract from each video image is determined.

($\gamma$-2) is a way to perform weighting with the recording time of the video image. The recording time Fm is obtained from each video image. The number of the still images to extract from the video image (Cm=g(Fm, $\beta$); g is a weighting function) is determined according to Fm and $\beta$.

In addition, C (the number of the thumbnails to be extracted from each video image) and G (the number of the index prints to be used in the video image service) are freely set based on a policy of a service provider. C may be set by an end user. However, the restriction of B$\geqq$C is provided to arrange the thumbnail extracted from the same video image as described above, and even when the user inputs a value C more than B, the input is ignored or the input is deauthorized, and then an alarm is displayed.

As stated above, in the present embodiment, it is possible to additionally extract the thumbnails from the video image and to fill the margin space according to the margin space of the print area, so that the margin of the paper is not wasted and the content of the video image is easily recognized. There is a big advantage especially for an end user who shoots many video images (for example, parents who shoot a video image of their child).

Second Embodiment

In the first embodiment, the thumbnail is extracted from the video image according to the margin space of the print area. However, for example, when the display area of the index on the display (display device) 16 is predetermined, the margin amount $\beta$ in state that the initial number a of thumbnails is arranged in the display area is calculated and according to the margin amount, the number of the thumbnails to be added $\gamma$ may be determined. In this way, the margin in the display area is filled with the thumbnails of the video image and the content of the video image is understood better. As the result, the margin in the display area is effectively used. Also, as described above, the display area of the index may be corresponding to the size of the picture print.

The display device with the predetermined display area of the index is not limited to the display device 16 which is a peripheral device of the photo printer system 10. For example, the display device can be a display device provided in the digital camera, the mobile telephone, the terminal device, etc. which is temporarily connected to the photo printer system 10. In this case, the photo printer system 10 obtains the information indicating the display area of the index (X: the maximum number of the thumbnails to be arranged per one screen according to a size of a liquid crystal display, and Y: the number of the pages of the index display screen) from the connected device. Next, the redundant number $\gamma=X\times Y-\alpha$ is calculated with the a which is calculated above. Then, in case of $\gamma>0$, the thumbnail with the number of $X\times Y$ is generated based on the video image. The desired thumbnail of the thumbnails displayed on the display device is chosen and designated with the input device 12 (or by operating the key of the digital camera, the mobile telephone, terminal device, etc.), the image processing unit 18 can reproduce the video image started from the frame corresponding to the designated thumbnail on the display device.

Moreover, the output area of the index can be provided on an electrical medium such as 'PDF' of Adobe Systems Incorporated. The image processing unit 18 arranges the thumbnail in the output area on the electrical medium, and the electrical medium can be output to the recording medium 22 and delivered to a desired other communication device (not shown) connected to the photo printer system 10 via a communication network such as an internet.

Other Embodiment

Figure 5:
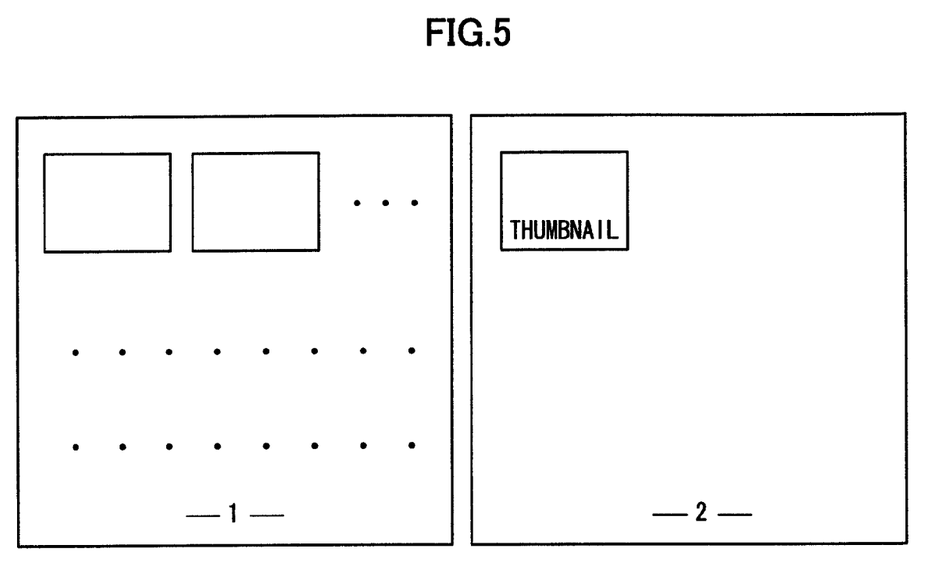
FIG. 5 is a diagram showing an extracted thumbnail arranged on a subsequent page.

Before the thumbnail is additionally extracted from the video image, in case that the number of the thumbnails is less than the predetermined number per one page and the margin space is extremely large, for example, as shown in FIG. 5, the thumbnail in the page 2 is one, the thumbnail of each video image may be equally erased or the thumbnail of the video image having a lower priority (a video image with a short recording time or an old time stamp) may be preferentially erased so that the page having the large margin space can be eliminated.

While the present invention have been explained in detail, the present invention is not limited to the above examples, and needless to say, various improvements and modifications may be added without departing from the scope of the present invention.

What is claimed is:

1. An image processing apparatus comprising:
   an input unit which inputs a contents data group including at least a video image;
   a first reference image number determination unit which determines a first reference image number which is a provisional number of reference images including thumbnail images and icons, the reference images corresponding to the contents data group inputted from the input unit;
   a margin amount calculating unit which calculates an amount of a margin to be left in a predetermined output area, in case where the first reference image number of reference images corresponding to the contents data group are arranged in the predetermined output area, the first reference image number determined by the first reference image number determination unit;
   a second reference image number determination unit which determines a number of the reference images to be added to the first reference image number based on the amount of the margin calculated by the margin amount calculating unit, and then determines a second reference image number which is a final number of the reference images corresponding to the contents data group equal to the first reference image number plus the number of reference images to be added; and
   an extracting unit which extracts a number of still images equivalent to the second reference image number from a video image included in the contents data group inputted by the input unit.

2. The image processing apparatus according to claim 1, further comprising
   a reference image generating unit which generates a number of the reference images equivalent to the second reference image number, the reference images corresponding to the contents data group inputted by the input unit.

3. The image processing apparatus according to claim 2, wherein
   the reference image generating unit generates the reference images based on the still images extracted by the extracting unit.

4. The image processing apparatus according to claim 3, wherein
   the second reference image number determination unit determines the number of the reference images to be added so far as the reference images fill in the margin.

5. The image processing apparatus according to claim 1, wherein
   the second reference image number determination unit determines the number of the reference images to be added so far as the reference images fill in the margin.

6. The image processing apparatus according to claim 1, wherein
   the contents data group further includes a still image.

7. The image processing apparatus according to claim 6, further comprising
   an output data generating unit which generates output data indicating a list of the contents data group with arranging the reference images generated by the reference image generating unit in the predetermined output area.

8. The image processing apparatus according to claim 1, further comprising
   an output data generating unit which generates output data indicating a list of the contents data group with arranging the reference images generated by the reference image generating unit in the predetermined output area.

9. The image processing apparatus according to claim 8, wherein
   the output data generating unit generates data to which information indicating an association between a plurality of the reference images generated based on the same video image, is added.

10. The image processing apparatus according to claim 9, further comprising:
    a print data generating unit, included in the output data generating unit, which generates print data for an index print to indicate the list of the contents data group; and
    a print unit which generates the index print on a predetermined print medium based on the print data for the index print.

11. The image processing apparatus according to claim 9, wherein
    the output data generating unit includes a display data generating unit which generates display data for a list screen to indicate a list of the contents data group.

12. The image processing apparatus according to claim 8, further comprising:
    a print data generating unit, included in the output data generating unit, which generates print data for an index print indicating the list of the contents data group; and
    a print unit which generates the index print on a predetermined print medium based on the print data for the index print.

13. The image processing apparatus according to claim 12, wherein
    the output data generating unit includes a display data generating unit which generates display data for a list screen to indicate a list of the contents data group.

14. The image processing apparatus according to claim 8, wherein
    the output data generating unit includes a display data generating unit to generate an indication data for a list screen to indicate a list of the contents data group.

15. The image processing apparatus according to claim 14, further comprising
    a display unit which displays the list screen based on the display data for the list screen generated by the display data generating unit.

16. An image processing method performed by a computer, the method comprising:
    an input step of inputting a contents data group including at least a video image;
    a first reference image number determination step of determining a first reference image number which is a provisional number of reference images including thumbnail images and icons, the reference images corresponding to the inputted contents data group;
    a margin amount calculating step of calculating an amount of a margin to be left in a predetermined output area, in case where the first reference image number of reference images corresponding to the contents data group are arranged in the predetermined output area;

a second reference image number determination step of determining a number of reference images to be added to the first reference image number based on the amount of the margin, and then determining a second reference image number which is a final number of the reference images corresponding to the contents data group equal to the first reference image number plus the number of the reference image to be added; and an extracting step of extracting a number of still images equivalent to the second reference image number from a video image included in the contents data group inputted by the input unit.

17. A non-transitory computer-readable recording medium on which a program causing a computer to execute the image processing method according to claim 16.

* * * * *